July 30, 1968    H. WEHDE ETAL    3,394,596
NAVIGATION EQUIPMENT
Filed Aug. 27, 1965    3 Sheets-Sheet 1

INVENTORS
Heinz Wehde
Werner Auer
Dieter Thomaier &
Heinz Riethmüller

BY Spencer & Kaye
ATTORNEYS

INVENTORS
Heinz Wehde
Werner Auer
Dieter Thomaier &
Heinz Riethmüller

BY Spencer & Kaye

ATTORNEYS

July 30, 1968   H. WEHDE ET AL   3,394,596

NAVIGATION EQUIPMENT

Filed Aug. 27, 1965   3 Sheets-Sheet 3

INVENTORS
Heinz Wehde
Werner Auer
Dieter Thomaier &
Heinz Riethmüller

BY Spencer & Kaye

ATTORNEYS

United States Patent Office 3,394,596
Patented July 30, 1968

3,394,596
NAVIGATION EQUIPMENT
Heinz Wehde, Werner Auer, and Dieter Thomaier, Heidelberg, and Heinz Riethmüller, Heidelberg-Kirchheim, Germany, assignors to Teldix Luftfahrt-Ausrustungs GmbH, Heidelberg-Wieblingen, Germany
Filed Aug. 27, 1965, Ser. No. 483,151
Claims priority, application Germany, Aug. 29, 1964, T 26,905
20 Claims. (Cl. 74—5)

ABSTRACT OF THE DISCLOSURE

A gyro which is operable selectively as a two-degrees-of-freedom directional gyro or as a one-degree-of-freedom gyro compass. The gyro consists of a gyro rotor, a horizontal bearing for mounting the rotor for rotation about an elevation axis and first and second vertical bearings for mounting the rotor about an upright axis. The first vertical bearing includes elastic means which acts against a force which causes the spin axis of the rotor to form an angle with an imaginary vertical reference plane in the first vertical bearing. A follow-up system is provided which is responsive to this angle for applying to the second vertical bearing a force which aligns the second vertical bearing with the spin axis.

The gyro operates as a directional gyro when the horizontal bearing is unblocked, the first vertical bearing is blocked, and the follow-up system is disengaged. The gyro operates as a gyro compass when the horizontal bearing is blocked, the first vertical bearing is unblocked and the follow-up system is engaged.

The present invention relates to a piece of navigation equipment and, more particularly, to a direction seeking and direction maintaining gyro, i.e., a combined directional gyro and gyro compass.

There exist gyro arrangements which incorporate a directional gyro that serves as an azimuth reference while the craft carrying the gyro is en route and a north-seeking or so-called gyro compass for adjusting the course indication, the adjustment being made from time to time and the course error which has arisen is corrected. In such a gyro arrangement, the north-seeking gyro compass is a one-degree-of-freedom gyro, that is to say, a gyro having a rotor which, in addition to its being rotatable about its spin axis, has a degree of freedom about an upright axis which is as nearly vertical as possible. This last-mentioned degree of freedom, however, is limited by spring means or other type of elastic connection between the first frame of the gyro, this being the frame which carries the gyro rotor and its drive motor, and the second frame—which may be a housing—which is turnable about the upright axis and which is connected to be driven by a follow-up servomotor. A directional gyro, on the other hand, does not have any such elastic connection which limits turning about the vertical axis, instead, there is an additional degree of freedom, namely, turning about its normally horizontal so-called elevation axis.

The present invention has as its primary object to provide a gyro arrangement which is significantly less complicated than heretofore known gyro arrangements which incorporate a separate directional gyro and a separate gyro compass, and, with this object in view, the present invention resides, basically, in a gyro which is operable selectively as a two-degrees-of-freedom directional gyro or as a one-degree-of-freedom gyro compass.

One embodiment of such a gyro comprises, basically, a gyro rotor which is rotatable about a spin axis, there being a horizontal bearing for mounting this rotor for rotation about an elevation axis and first and second vertical bearings for mounting the rotor for rotation about an upright axis, the first vertical bearing including elastic means acting against a force which causes the spin axis to form an angle with an imaginary vertical reference plane in the first vertical bearing. A follow-up system is provided which is responsive to this angle for applying to the second vertical bearing a force which aligns the second vertical bearing with the spin axis.

In order to allow the gyro to operate either as a directional gyro or as a gyro compass, the gyro includes means which unblock the horizontal bearing means, block the first vertical bearing, and disengage the follow-up system when the gyro is to operate as a two-degrees-of-freedom directional gyro, and which block the horizontal bearing, unblock the first vertical bearing, and engage the follow-up system when the gyro is to operate as a one-degree-of-freedom gyro compass.

In another embodiment of a gyro according to the present invention, a first bearing is provided for mounting the gyro rotor for rotation about an upright axis and a second bearing is provided which mounts the gyro rotor for rotation about a desired axis, this second bearing being mounted for movement between a gyro compass position in which the desired axis is an upright axis and a directional gyro position in which the desired axis is an elevation axis. In this embodiment, the follow-up means are operative only when the second bearing is in its gyro compass position and, being responsive to the angle between the spin axis and an imaginary vertical reference plane in the first bearing, applies to the second bearing a force which aligns the second bearing with the spin axis.

Additional objects and advantages of the present invention will become apparent upon consideration of the following description when taken in conjunction with the accompanying drawings in which.

Figure 1:
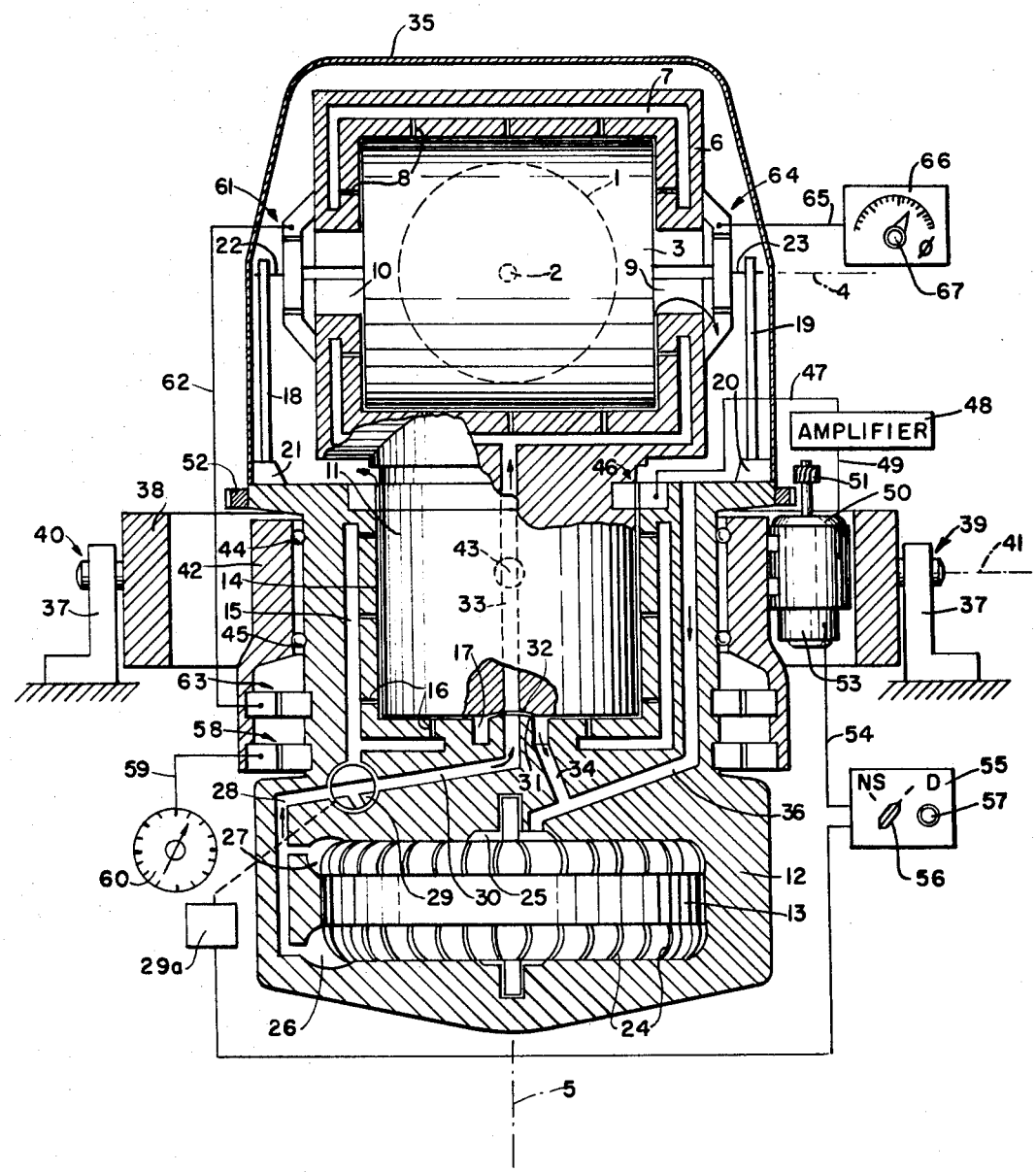
FIGURE 1 is a sectional elevation of one embodiment of a gyro according to the present invention.

Referring now to the drawings and first to FIGURE 1 thereof, the same shows a gyro according to the present invention and capable of operating either as a directional gyro or as a gyro compass. The gyro has a gyro rotor 1 which spins about a normally horizontal spin axis 2 and which is supported for rotation about this axis 2 within a so-called elevation cylinder 3. The axis of this cylinder 3 is the elevation axis 4 and is precisely at right angles to the spin axis 2 and also the upright or vertical axis 5 of the system. The outer cylindrical surface as well as the end faces of the cylinder 3 are as smooth as possible, the cylinder being fitted within an elevation bearing housing 6 whose inner cylindrical surface and end faces are likewise as smooth as possible. The housing 6 itself is provided with a system of channels 7 through which flows a gaseous medium under pressure, there being fine inlet channels 8 which extend radially and axially and which causes the gas to flow toward the surfaces of the cylinder 3 at right angles thereto, thereby to form a gas cushion which supports the cylinder 3 within the housing 6. The gas flows through the very narrow gap between the outer surfaces of the cylinder 3 and the inner surfaces of the housing 6 to the two axially directed outlet openings which are provided at the end faces, through which the gas leaves the housing 6, as indicated by the arrow at the right-hand axial opening 9. The inlet channels 8 are, as indicated in FIGURE 1, distributed over the cylindrical surfaces and the end faces of the inner surface of the housing 6, so that the elevation bearing cylinder 3, which carries the gyro rotor 1, can turn about the elevation axis 4, virtually without friction, so long as the system of channels 7 is in communication with a source of gaseous fluid under pressure.

The housing 6 is provided with a downwardly extending cylindrical projection 11, the cylinder forming the first projection being part of a first vertical bearing for the upright axis of the gyro. This bearing is also fashioned as a static gas cushion bearing, as explained above in connection with the elevation bearing. The housing 12 for the cylinder 11 is unitary with the housing of a second gyro rotor 13 this being a gyro having a vertical spin axis. The housing 12 is provided with a cylindrical bore 14 within which the cylinder 11 is received, there being a system of channels 15 in communication, via fine inlet channels 16, with the narrow gap between the cylinder 11 and housing 12. The gaseous medium under pressure can flow from this gap to an annular collector channel 17 at the bottom of the bore 14, while the gas which enters into the gap near the top thereof may flow out of the gap through the open upper end of the cylinder 11, as indicated by the arrow at the left. Thus, so long as the system of channels 15 is under pressure, the cylinder 11, and with it the gyro rotor 1, can turn, practically without friction, about the upright axis 5.

The rotation of the cyinder 11 about the upright axis 5 is limited by an elastic connection in the form of two thin leaf springs 18 and 19, the same being connected to the housing 12 via insulating connectors 20 and 21. FIGURE 1 shows the flat sides of the springs which press, under some bias, against two pins 22 and 23 that project laterally from the two sides of the housing 6 and lie in the elevation axis 4. The least rotation of the cylinder 11 about the upright axis 5 brings about an elastic bending of one of the two springs. If there are no external torques acting on the cylinder 11, the same will assume a so-called elastic equilibrium or quiescent position within the housing 12, this position being determined by the springs. These springs may serve not only as the mechanical means which define the equilibrium position of the cylinder 11 but may also constitute electric current lead-in means for the electric motor (not shown) that drives the gyro rotor 1.

According to the present invention, the two gas cushions described above are operated alternatively, and this is made possible by means of a suitable gas pressure supply system. The above-mentioned second gyro rotor 13 is fashioned as a pressure generator, i.e., a pump, and comprises, at each side, a ring of buckets 24 which draw in gas from an axial ring channel 25 and which force the gas out through two outer spiral channels 26 and 27, from whence the gas—now under pressure—flows to a selector valve 29 in the form of a three-way valve which passes the gas under pressure either to the pressure gas channel system 15 or to a channel 30, the latter ending at the center of the bottom of the cylindrical bore 14. The mouth of the channel 30 is in the shape of a flat cone 31 which fits into a mating cone 32 of the vertical cylinder 11. The latter is provided with an axial channel 33 which communicates with the pressure gas channel system 7 of the elevation bearing.

When the selector valve 29 is in the position shown in FIGURE 1, the vertical bearing receives no gas under pressure. Consequently, the cylinder 11 will, under the influence of its own weight and the weight of all of the parts which it carries, settle to the bottom of the bore 14 so that the cones 31 and 32 will be in intimate face-to-face contact with each other. The vertical bearing is thus prevented from acting as a bearing, ie., the bearing will be blocked in the sense that it does not free the cylinder 11 for rotation about the upright axis. At the same time, the channel 30 is in communication with the channel 33. As a result, the gaseous medium under pressure will flow into the elevation bearing and thereby activate, or unblock, the same, i.e., thereby enabling the elevation bearing to function as a bearing and to permit the cylinder 3 to rotate freely about the axis 4.

If the selector valve 29 is rotated in clockwise direction from the position shown in FIGURE 1 throughout an angle of about 100°, the channel 28 is taken out of communication with the channel 30 and is placed in communication with the system 15. Now it will be the elevation bearing which, under the influence of its weight and of the weight of the parts it carries, settles down in and of the bore within which it is arranged while the vertical bearing now receives the gas under pressure i.e., the horizontal elevation bearing is blocked and the vertical bearing is unblocked. It will be noted that the separation of the cone 32 from the cone 31 is of no import inasmuch as the opening of the channel 33 is surrounded by the annular collector channel 17, which itself is connected to the intake side of the pressure generator—as will be explained shortly—and which is, therefore, at an underpressure. Consequently, no gas under pressure will be able to reach the elevation bearing.

Gas in the collector channel 17 is drawn off directly via channel 34. Also, the gas flowing out at the top of the vertical bearing as well as the spent exhaust gas of the elevation bearing is prevented from flowing to the outside inasmuch as the elevation housing as well as the springs 18, 19, are surrounded by a dome 35 which is fluid-tightly connected to the housing 12 of the vertical bearing. A channel 36 communicates with the space enclosed by the dome 35, so that the entire gas pressure system is a closed system.

The gaseous medium may, for example, be desiccated air, or nitrogen, or a nitrogen-oxygen mixture other than air. Alternatively, the gaseous medium may be constituted by a rare gas, or a gaseous mixture containing a rare gas as one of its constituents. The criteria which govern the selection of the gaseous medium will involve not only the usual factors such as low corrosiveness, ability to operate in the presence of lubricants and good heat conductivity, but also the medium should have as high a specific gravity as possible, inasmuch as the characteristics of the gas cushion bearings and, above all, the efficiency of valveless pressure generators, is dependent thereon.

The vertical housing 12 is mounted in a frame 37 by means of a cardanic or so-called gimbal suspension, the frame 37 being fixedly connected to the vehicle carrying the gyro. The outer gimbal ring 38 is mounted by pins 39 and 40 so as to be rotatable about a first gimbal axis 41. The inner gimbal ring 42 is rotatably mounted within the outer ring about a second gimbal axis 43, the pins affording this rotation about the second gimbal axis being shown in dashed lines. The inner gimbal ring 42 also serves as the outer ring of a second vertical bearing which is fashioned as a ball bearing and which enables the vertical bearing housing 12 to rotate about the vertical axis. FIGURE 1 shows two rings of ball bearings at 44 and 45. It will thus be noted that the housing 12 is itself a component part of both the first and the second vertical bearing, the first vertical bearing being the rotation about the upright axis afforded by the relative rotation of cylinder 11 and housing 12, and the second vertical bearing being the rotation about the upright axis afforded by the relative rotation of housing 12 and the gimbal ring 42.

Also shown are the various control and follow-up systems. A pick-up 46 which senses the position of the first vertical bearing 11, 12, and produces a signal indicative of this position is built into the upper end of the first vertical bearing, the output of this pick-up 46—which may, for example, be an inductive pick-up—being connected, via a lead 47, to an amplifier 48 whose output is applied via a line 49 to a servomotor 50. The motor 50 is secured to the inner gimbal ring 42 and has an axially displaceable shaft carrying a pinion 51 provided with oblique gear teeth. In this way, the pinion 51 can be brought into and out of engagement with a gear ring 52 carried by the housing 12. The shaft of the motor 50 is moved axially by means of a magnet 53 which it attached to the motor, the magnet being connected via a lead 54 to a control box 55 having a control knob 56 and a control lamp 57, the electrical connection being such that when the knob 56 is in the position NS, standing for North-South, the magnet 53 is energized thereby to draw the motor shaft, and with it the pinion 51, downwardly as viewed in FIGURE 1. This brings the pinion 51 into mesh with the gear ring 52, and the gyro then acts as a north-seeking gyro compass, in a manner well known in the art. The magnet is deenergized when the knob 56 is in position D, whereupon the gyro operates as a directional gyro.

A second pick-up 58 is mounted on the second vertical bearing 12, 42, and puts out a signal representative of the position of the vertical bearing housing 12 relative to the inner gimbal ring 42. This pick-up 58 is connected via a lead 59 to a course indicator 60.

A third pick-up 61 is shown at the left of the elevation bearing. This pick-up puts out positive or negative signals whenever the spin axis moves out of a position wherein it is at right angles to the upright axis. The signals put out by the pick-up 61 are applied via a line 62 to a torquer 63 which is arranged on the second vertical bearing next to the pick-up 58.

A further torquer 64 is arranged at the right side of the elevation bearing for correcting for drift due to rotation of the earth when the gyro is operated as a directional gyro. The torquer 64 is connected via a line 65 with a setting device 66 which adjusts the torquer 64 so that the same puts out a correction signal that is dependent on the geographic latitude $\phi$. The device 66 is calibrated in degrees latitude and can be set by means of a knob 67.

The upright axis 5 can be compensated for precession in any suitable manner, for example, by means of conventional precession devices for vertical gyros which produce precession moments independently of the craft aboard which the gyro is carried, as, for intsance, a ball-type device.

The gyro of FIGURE 1 operates as follows:

When the second gyro rotor 13 rotates, the device will assume a position in which the upright axis is, in fact, vertical. When the second gyro rotor is at rest, the device has no preferred position inasmuch as the center of gravity lies at the intersection of the two gimbal axes. As the torque pulses of the second gyro rotor change, that is to say, as the rotor accelerates to normal running speed, the housing 12 of the vertical bearing would tend to align itself with the vertical upright axis. The second gyro rotor is therefore switched in or out only when the knob 56 is in the NS position, this being the position in which the follow-up servomotor 50 is engaged, so that, due to the substantial transmission ratio and the inertia of the rotor of the servomotor, the housing 12 is blocked.

The first gyro rotor 1 is then put into the operation. The knob 56 remains in its NS position, and the selector-valve 29 is changed over from the position shown in FIGURE 1. The spin axis 2 of the first gyro rotor is thus held at right angles to the vertical axis, while the gyro can rotate fritcionlessly in the first vertical bearing 11, 12, but against the restoring force of the springs 18 and 19. Unless the spin axis 2 happens to be in the north-south position, the first vertical bearing will undergo an angular deflection in that the cylinder 11 will turn relative to housing 12, and this is sensed by the pick-up 46, as a result of which the motor 50 is made to rotate the housing 12 into a position wherein this deflection becomes zero. This causes the lamp 57 to light—the electrical circuitry not being shown—which is the indication that the arrangement, which up to now operated as a gyro compass, is now ready to be switched over to operate as a directional gyro. Inasmuch as changing the course of the craft druing the time the gyro seeks the north-south direction prolongs the above-described step, it is best if this is done while the craft is stationary.

When the gyro is switched over to operation as a directional gyro, the knob 56 is turned to the position D, thereby disengaging the motor 50. The selector valve 29 is then switched back to the position illustrated in FIGURE 1, as a result of which the first vertical bearing ceases to operate and the elevation bearing becomes functional, i.e., the first vertical bearing is blocked and the horizontal bearing is unblocked. The degree of freedom about the vertical axis is, however, now afforded by the second vertical bearing 12, 42, i.e., the above-mentioned ball-bearings 44, 45, between the housing 12 and the gimbal ring 42. The torque on the elevation axis which is dependent on the degree of latitude is such as just to prevent the natural drift of the directional gyro as the result of the earth's rotation, so that the spin axis remains oriented in the north-south direction. Should the spin axis move out of its horizontal position, i.e., should the horizontal axis move out of a position wherein it is at right angles to the upright axis, the torquer 63 will, under the influence of the pick-up 61, impart a torque about the upright axis which allows the gyro rotor 1 again to precess into a position wherein the spin axis is horizontal.

The course heading is shown by the indicator 60 during either type of operation of the gyro. Should, in time, a course error develop, the same can be corrected at any time by switching the knob 56 to NS.

In the interest of simplicity of operation, the selector valve 29 may be provided with electrical actuator means 29a which are controlled by the knob 56, so that only that knob need be actuated for changing over between operation of the gyro as a directional gyro and as a gyro compass.

Figure 2:
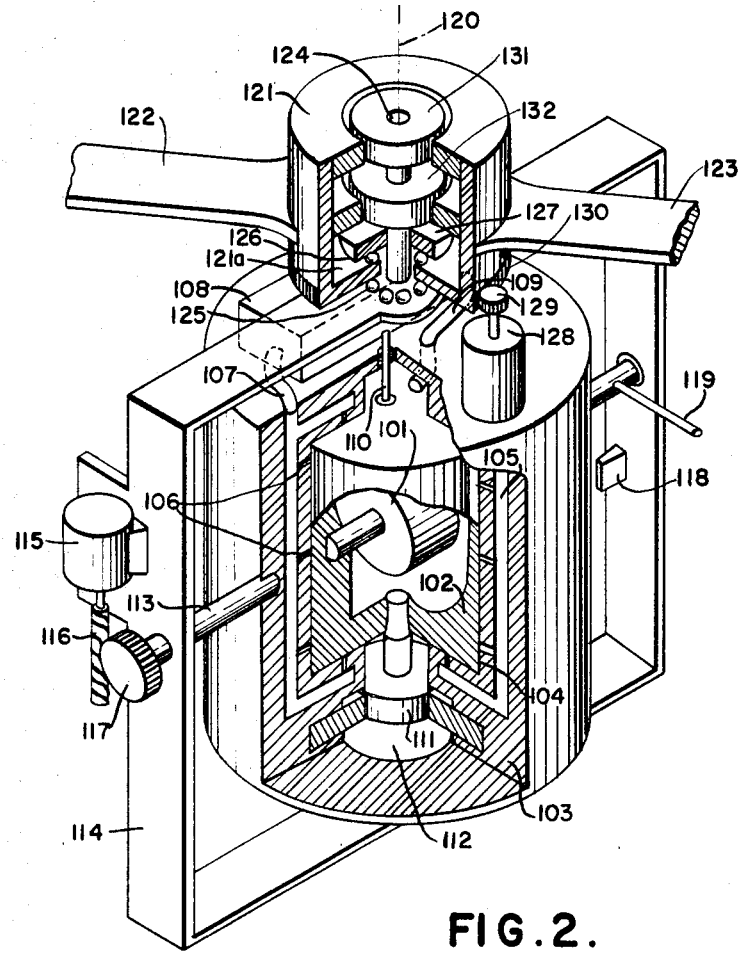
FIGURE 2 is a sectional elevation of a second embodiment of a gyro according to the present invention.

FIGURE 2 shows a second embodiment of a gyro according to the present invention and includes a gyro rotor 101 which is rotatably mounted in a so-called gyro cylinder 102. The spin axis of the gyro rotor is at right angles to the axis of the cylinder 102. The gyro cylinder 102 is completely surrounded by a gas cushion-type bearing housing 103 so that but a very small gap 104 is formed between the inner wall of the housing 103 and the outer surface of the cylinder 102. This gap is enlarged in the central regions of the end faces of the cylinder 102. The housing 103 is provided with a gas channel system 105 which forms an inlet chamber and which is placed in communication with the gap forming the gas cushion by means of nozzles 106, there being, in the illustrated embodiment, three rings of nozzles communicating with the cylindrical surface of the cylinder 102 and one ring of nozzles communicating with each respective end face. The channel system 105 is connected via a conduit 107 with a block-shaped gas pressure generator 108, only a portion of which is shown in FIGURE 2. When the gaseous medium under pressure flows through the nozzles 106 into the air gap 104, the gyro cylinder 102 is suspended substantially frictionlessly. Spent gas from the gas cushion is returned to the gas pressure generator 108 via a return conduit 109.

The elastic connection between the two members 102, 103 forming the gas cushion bearing is established by means of a narrow leaf spring 110 which is near the axis of the bearing and extends parallel thereto from the gyro cylinder 102 to the housing 103. The two ends of the spring are engaged in an insulating manner; the spring together with additional springs (not shown) serves as the electric lead-in means for the gyro rotor drive motor. Any angular deflection of the gyro cylinder 102 with respect to the housing 103 is sensed by an electric pick-up 111 whose rotor is carried by a short central boss at the underside of the gyro cylinder 102. The stator of the pick-up 111, shown schematically only, is let into the housing. A bottom 112 is provided for sealing off the space within which the position-sensitive pick-up is arranged.

The housing 103 is mounted in a carrier frame 114 by means of a pivot shaft 113. The pivot shaft 113 is in alignment with the spin axis of the gyro since, in the drawing, the gyro is in its central or equilibrium position, i.e., the position in which the springs 110 are wholly unstressed and the pick-up 111 puts out no signal. The pivoting means comprise a pivoting motor 115 which is connected to the shaft 113 by means of a worm 116 and worm wheel 117. The frame 114 carries an abutment 118 which is in the path of a pin 119 carried by the shaft 113, these parts coacting to limit the pivotal movement to an angle of 90°. The gyro is shown during its north-seeking or gyro compass operation in which the axis of the gas cushion bearing is vertical and is in alignment with the upright axis 120. The carrier frame 114 is rotatably mounted about the upright axis 120 by means of a bearing head 121 which is held by two struts 122 and 123. In a simplified version of the instant embodiment, the two struts 122 and 123 are secured to the craft carrying the gyro, while in the modifications to be described in conjunction with FIGURES 3 and 4, they form part of the inner one of two gimbal frames. The head 121 has a bottom 121a through which passes an upwardly extending shaft 124 that is secured to the frame 114. A first ring of ball bearings 125 is arranged between the upper cross piece of the frame 114 and the bottom of the head 121a. A second ring of ball bearings 126 is interposed between the bottom 121a and a carrier ring 127 which is threadedly connected to the shaft 124. These ball bearings run in conventional races and securely support the carrier frame and the gas bearing housing on the head 121.

The follow-up means which rotate the frame 114 about the upright axis comprises a servomotor 128 whose pinion 129 engages a gear ring 130 carried by the head 121. The motor is mounted on a cover of the housing 103 such that the pinion 129 is in a radial plane of the gear ring 130. Also interposed between the shaft 124 of the frame 114 and the head 121 are a position-sensitive pick-up 131 for indicating any angular deflection between the two parts as well as a torquer 132 for adjusting the horizontal position of the directional gyro.

The operation of the gyro of FIGURE 2 is as follows. Assuming the gyro is to function as a north-seeking gyro compass, the upright axis 120 will be vertical. The spin axis of the gyro will initially not necessarily be aligned with the north-south direction, but the gyro will seek to occupy a position wherein its spin axis is aligned with the north-south direction due to the rotation of the earth and the force acting upon the spin axis. The gyro cylinder will thus be turned with respect to the housing 103, and this movement is immediately sensed by the pick-up 111 and causes the motor 128—via a suitable amplifier, which is not shown in the embodiment of FIGURE 2 but which is comparable to the servoamplifier depicted in FIGURE 1—to turn the pinion 129. This will not cause the stationary gear ring 130 to be turned, instead, the motor 128 itself is orbited about the stationary gear 130 and, in so orbiting, carries with it the housing 103 to which the motor 128 is connected. In this way, the housing 103 and the frame 114 are rotated in a direction which reduces the deflection of the cylinder 102 with respect to the housing 103 to zero. This means that the rotation of the housing 103 under the influence of the motor 128 is continued until the spin axis of the gyro 101 is aligned with the north-south direction, because the pick-up will then no longer produce an output signal. For the reasons explained above, it is best if the craft the arrangement is not moving during this time.

The gyro can now be swiched over to operation as a directional gyro. The pivot axis is in alignment with the spin axis of the gyro. The pivoting motor 115 is set into operation and pivots the housing 103 until the pin 119 strikes the abutment 118. In the course of this, the pinion 129 will have disengaged itself from the gear ring 130 (see FIGURE 4) so that the frame is freely rotatable about the upright axis. If necessary, the frame 114 can be held stationary with respect to the struts 122 and 123 during the pivotal movement. The spin axis of the gyro will now maintain its north-south direction independently of movements of the craft.

The arrangement also includes conventional means (not shown) for correcting for drift due to the earth's rotation. The spin axis is maintained horizontal by means of a sensing device (not shown) which responds to vertical orientation and which coacts with a torquer 132 so as to let the gyro precess back into the horizontal position as soon as there is a deviation from the horizontal.

In FIGURE 3, there is again shown the gas cushion housing 103, the pump 108, the pivot shaft 113, the carrier frame 114, the bearing head 121 with its struts 122 and 123, the gear ring 130 and the pinion 129 of the follow-up servomotor 128 (all as described in the embodiment of FIGURE 2. In the instant embodiment, however, the head 121 together with its struts 122 and 123 constitutes an inner gimbal frame which is turnably mounted in an outer gimbal frame 135 by means of pins 133 and 134. The outer frame is turnable in a bearing ring 137 about an axis which is at right angles to the plane of the drawing, this ring 137 being fixedly mounted on the craft carrying the gyro. The shaft corresponding to shaft 124 of the embodiment of FIGURE 2 is extended and designated, in FIGURE 3, as shaft 124′, this shaft carrying at its upper end a frame 139 of a gyro rotor 140. The spin axis of this gyro rotor 140 is in alignment with the upright axis. The center of gravity of the arrangement lies in the intersection of the gimbal axes. The abutment means which limit the pivotal movement of the housing 103 comprises two abutment pins 141 and 142 which are in the path of a segment 143 mounted on the shaft 113 for rotation therewith. The means for pivoting the shaft 113 are on the opposite side and are, therefore, not shown in FIGURE 3.

Figure 3:
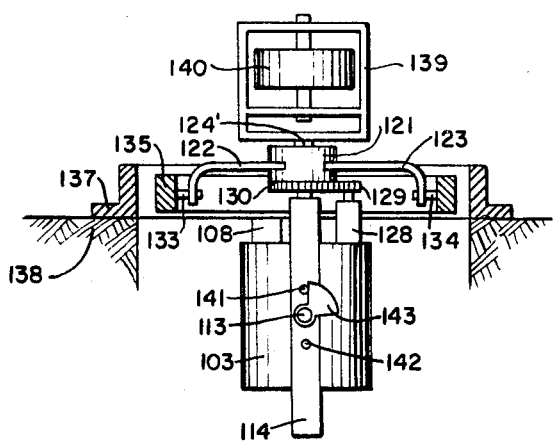
FIGURE 3 is a simplified, sectional elevation of a third embodiment of a gyro according to the present invention.

In the arrangement of FIGURE 3 the upright axis is verically stabilized. Here, too, the gyro rotor 140 will be equipped with conventional precession compensating means in order to compensate for the influence of the earth's rotation and the bearing friction which itself can not be measured precisely. The vertical sensing device mentioned in connection with the embodiment of FIGURE 2 can thus be dispensed with since, with the upright axis being stabilized, the position pick-up 111 will sense the angle between the spin axis of the gyro 101 and the horizontal. Thus, in the embodiment of FIGURE 3, when the gyro is switched over from one type of operation to the other, the pick-up 111 is disconnected from the follow-up servomotor 128 and connected to the torquer 132.

Figure 4:
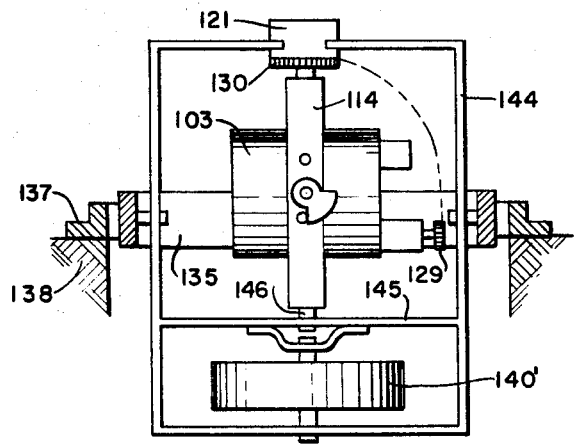
FIGURE 4 is a simplified, sectional elevation of a fourth embodiment of a gyro according to the present invention.

In the embodiment of FIGURE 4, an outer gimbal frame 135 is again shown as being arranged within a bearing ring 137. The outer carrier frame 144 or inner gimbal frame is rectangular and divided into an upper and a lower part by means of an intermediate cross piece 145. Arranged in the upper part is the carrier frame 114, and is turnably mounted by means of the head 121 and a pin 146. Arranged in the lower part is a gyro rotor 140′ whose axis lies in the upright axis. The gas cushion is shown in its horizontal position.

The arrangement of FIGURE 4 operates in a manner similar to that of FIGURE 3, except that the gyro rotor 140′ can be accelerated or decelerated in any pivoted position of the gas cushion housing. In the embodiment of FIGURE 3, torque pulses can be applied to the gyro rotor 140 only when the pinion 129 is in mesh with the gear ring 130 so that angular acceleration of the carrier frame 114 as a result of the reaction moment of the gyro rotor is prevented. On the other hand, the embodiment of FIGURE 3 has the advantage over that of FIGURE 4 in that, if the gyro rotor 140 is fashioned to serve as the gas pressure generator (see FIGURE 1) in place of the gas pressure generator 108, the gas can be passed through the gas bearing housing 103 via a gas-tight though rotatable fixture extending through the pivot axis. The fixture is moved only during the pivoting, and this is done by the relatively powerful pivoting motor and will therefore have no effect on accuracy of the indication. If in, the embodiment of FIGURE 4, the gas pressure generator were constituted by the gyro rotor 140′, the gaseous medium under pressure would have to be piped through the upright bearing 121.

The servomotor 128 does not have to be secured to the housing 103. Instead, the follow-up movement could be produced by mounting the gear ring 130 rotatably on the head 121 and by driving this ring by means of a motor arranged on the strut 123. All that the housing 103 would then have to carry would be a pinion which could be brought into mesh with the gear ring irrespective of the angular position, so that by driving the motor, the housing 103 and with it the frame 114 would be turned. The gear connection between the ring 130 and the pinion would then be separated whenever the housing 103 is tilted.

Should the craft aboard which the gyro is carried require other horizontal reference planes, whether for navigational or other purposes, further position-sensing pick-ups can be arranged at the two gimbal axes, so as to make it possible to derive the necessary information.

Figure 5:
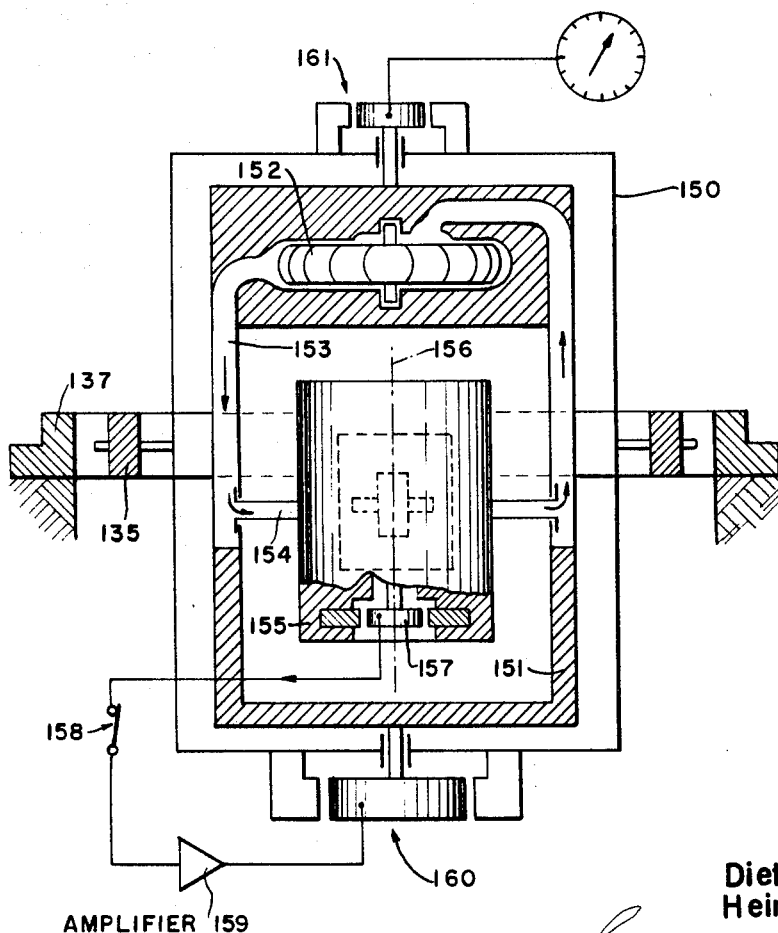
FIGURE 5 is a schematic sectional elevation of a fifth embodiment of a gyro according to the present invention.

In the embodiment shown in FIGURE 5, there is again a stationary frame 137 and the gimbal frame 135 whose axis is at right angles to the plane of the drawing. An outer carrier frame 150 is turnably mounted within the frame 135 and an inner frame 151 is turnably arranged within the frame 150. The gas cushion housing 155 is pivotably mounted within the inner frame by means of a hollow shaft 154, for pivotal movement by 90°. The gyro rotor 152 is fashioned to serve as a pressure pump, and a supply conduit 153 places the pump in communication with the hollow shaft 154. The pick-up 161 puts out a signal indicating the course, there being an electro-mechanical follow-up system 160 which drives the inner frame with respcet to the outer frame during operation of the device as a gyro compass. The pick-up 157 is connected via a switch 158 and an amplifier 159 to the follow-up servomotor. The switch 158 is operated by the movement of the gas cushion housing in such a manner that when the axis of housing 156 is vertical, the switch is closed, thereby energizing the follow-up system. The switch 158 is, however, opened when the housing 156 is in its horizontal position, this being the position this housing occupies when the gyro operates as a directional gyro. The pick-up 157 is then connected to a torquer (not shown) of the vertical bearing or to another winding of the torquer 160.

It will thus be seen from the above that, in accordance with the present invention, there is provided a gyro which can be operated either as a directional gyro or as a gyro compass. While in the embodiment of FIGURE 1, there are a horizontal bearing and a vertical bearing each of which can be blocked and unblocked, as well as a further vertical bearing which, when the follow-up means are disengaged, affords rotation about the up-right axis unhindered by the resilient coupling means that form part of the first-mentioned vertical bearing, the embodiments of FIGURES 2 through 5 each provide a vertical bearing as well as a second bearing which can be pivoted so that the axis of rotation afforded by this second bearing will be either vertical or horizontal. The change-over between the two modes of operation, i.e., directional gyro and gyro compass, can be effected with the spin axis of the gyro maintaining its holding.

The utilization of the gas cushion bearings is of particular value inasmuch as this type of bearing reduces the adverse effect of friction, the same being especially troublesome in that it results in unwanted torque just when the spin axis of the gyro rotor is very close to alignment with the north-south direction. This is so because the moment which causes the spin axis to assume its north-south direction is smallest when the spin axis is in the immediate vicinity of being so aligned.

Insofar as the embodiment of FIGURE 1 is concerned, the utilization of the gas cushion also affords a very simple way of blocking and unblocking the respective bearings.

The embodiments of FIGURES 2 through 5 have the particular advantage that one bearing is eliminated, thereby reducing the over-all costs of the gyro. It will be noted that the pivotal bearing has associated with it the resilient spring means which are needed when the gyro is to operate as a gyro compass. While no such spring means are needed when the bearing is in horizontal position, for directional gyro operation, the presence of the spring means will have no significant influence insofar as rotation about the elevation axis is concerned. But should it become desirable, for applications requiring the utmost precision, to eliminate even the small effect which the spring means have on the turning about the elevation axis, the gyro may be equipped with electrical spring means which have essentially the same spring constant as the mechanical springs and which, when the gyro is switched from gyro compass to directional gyro opreation, is energized thereby to offset, or at least to reduce, the mechanical spring constants to a truly negligible value.

It will also be appreciated that the gyros according to the present invention produce a number of other advantageous results over known gyros. One of the advantages is the utilization of gas pressure means which are connected with the gas cushion or cushions without flexible conduits, this being made possible by the fact that the gas pressure means are mounted on the gas cushion housing or are movable therewith. This, in turn, allows the gas pressure system to be made into a closed circulatory system which, provided the gaseous medium introduced initially is free of contamination, prevents dirt from entering the sealed system and thus makes it possible to obtain long periods of trouble-free operation. Moreover, if the gaseous medium is something other than air, the use of a closed circulatory system eliminates the expense incident to the continued supplying of fresh gas.

It should also be noted that when the gyro operates as a directional gyro, it is important that none of the gaseous medium flow out of the housing, lest it produce a reaction moment which adversely affects the accuracy of the gyro. This, too, is prevented by providing an entirely closed circulatory system.

Furthermore, the arrangement of the parts described above makes it possible to provide a reliable interlock insofar as the engagement and disengagement of the follow-up system is concerned. If, in the embodiment of FIGURE 1, the electromechanical selector valve actuator means are electrically connected to the electromechanical means which connect and disconnect the servomotor, the proper gas cushion will be blocked, or unblocked, upon each switch-over between operations. In the case of the embodiments of FIGURES 2 to 5, the physical separation of the servomotor, or of a part which is a component of the servomotor system, whenever the pivotable bearing is moved to its horizontal position, insures that all components operate in the desired manner at the proper times.

By mounting the gyro with gimbal rings and by providing a gyro rotor having its spin axis vertically oriented, the apparatus is well stabilized, in that the vertically oriented gyro rotor will cause the upright axis to remain vertical. This appreciably shortens the "warm up" time, i.e., the time required for the north-seeking gyro to assume north-south alignment. Also, the change-over between directional gyro and gyro compass operation can be carried out while the craft carrying the gyro is en route.

Another significant feature of the present invention is that the vertically oriented gyro rotor can itself be made to serve as the pressure pump. This is particularly advantageous when the frame carrying this gyro rotor is part of the first vertical bearing, in which case all movable conduits are eliminated or at least the conduit means may include a hollow pivotal conduit between the frame and the gas cushion housing. This will not adversely influence the gyro while operating as a directional gyro.

Another feature of the present invention is that when the vertically oriented gyro rotor is accelerated or decelerated, the gyro is switched to gyro compass operation, so that the follow-up servomotor will hold the housing of the vertically oriented gyro rotor in place.

It will be understood that the above description of the present invention is susceptible to various modifications, changes, and adaptations, and the same are intended to be comprehended within the meaning and range of equivalents of the appended claims.

What is claimed is:

1. A gyro operable selectively as a two-degrees-of-freedom directional gyro or as a one-degree-of-freedom gyro compass, comprising, in combination:
    (a) a gyro rotor rotatable about a spin axis;
    (b) first means selectively operable either for providing rotation of said rotor about a horizontal elevation axis or for preventing such rotation;
    (c) second means having an imaginary vertical reference plane selectively operable either for providing elastically limited rotation of said rotor about an upright axis or for preventing such rotation;
    (d) third means for mounting said rotor for free rotation about the upright axis;
    (e) follow-up means coacting with said third means and responsive to the angle between said spin axis and said imaginary vertical reference plane in said second means for applying to said third means a force which aligns said third means with said spin axis; and
    (f) means for causing said first means to provide its respective rotation, for causing said second means to prevent its respective rotation, and for disengaging said follow-up means when the gyro is to operate as a two-degrees-of-freedom directional gyro, and for causing said first means to prevent its respective rotation, for causing said second means to provide its respective rotation, and for engaging said follow-up means when the gyro is to operate as a one-degree-of-freedom gyro compass.

2. A gyro operable selectively as a two-degrees-of-freedom directional gyro or as a one-degree-of-freedom gyro compass, comprising, in combination:
    (a) a gyro rotor rotatable about a spin axis;
    (b) blockable and unblockable horizontal bearing means for mounting said rotor for rotation about an elevation axis;
    (c) blockable and unblockable first vertical bearing means for mounting said rotor for rotation about an upright axis and including elastic means acting against a force which causes said spin axis to form an angle with an imaginary vertical reference plane in said first vertical bearing means;
    (d) second vertical bearing means for mounting said rotor for rotation about the upright axis;
    (e) engageable and disengageable follow-up means responsive to the angle between said spin axis and said imaginary vertical reference plane in said first vertical bearing means for applying to said second vertical bearing means a force which aligns said second vertical bearing means with said spin axis; and
    (f) means for unblocking said horizontal bearing means, for blocking said first vertical bearing means, and for disengaging said follow-up means when the gyro is to operate as a two-degrees-of-freedom directional gyro and for blocking said horizontal bearing means, for unblocking said first vertical bearing means, and for engaging said follow-up means when the gyro is to operate as a one-degree-of-freedom gyro compass.

3. A gyro as defined in claim 2 wherein said horizontal bearing means and said first vertical bearing means each comprise gas cushion means.

4. A gyro as defined in claim 3, further comprising pressure pump means, conduit means connecting each of said gas cushion means with said pump means, and valve means for placing said two gas cushion means selectively in communication with said pump means.

5. A gyro as defined in claim 4 wherein said follow-up means comprise a servomotor and wherein said means (f) include electrically switchable means for mechanically coupling said servomotor to said second vertical bearing means.

6. A gyro as defined in claim 5 wherein said valve means include electromechanical actuator means, said actuator means being electrically connected to said electrically switchable means for enabling said motor and said valve means to be switched simultaneously, thereby to allow the gyro to be switched between operation as a directional gyro and operation as a gyro compass by the actuation of a single electrical switch.

7. A gyro as defined in claim 4, further comprising a second gyro rotor having its spin axis oriented in a vertical axis for stabilizing said vertical axis.

8. A gyro as defined in claim 7, wherein said second gyro rotor includes means constituting said pressure pump means.

9. A gyro operable selectively as a two-degrees-of-freedom directional gyro or as a one-degree-of-freedom gyro compass, comprising, in combination:
    (a) a gyro rotor rotatable about a spin axis;
    (b) first bearing means having an imaginary vertical reference plane for mounting said rotor for rotation about an upright axis;
    (c) second bearing means for mounting said rotor for rotation about a desired axis, said second bearing means being mounted for movement between a gyro compass position in which said desired axis is an upright axis and a directional gyro position in which said desired axis is an elevation axis; and
    (d) follow-up means operative only when said second bearing means is in said gyro compass position, said follow-up means being responsive to the angle between said spin axis and said imaginary vertical reference plane in said first bearing means for applying to said second bearing means a force which aligns said second bearing means with said spin axis.

10. A gyro as defined in claim 9 wherein said second bearing means include means for elastically limiting rotation of said rotor about said desired axis.

11. A gyro as defined in claim 10 wherein said second bearing means are mounted for pivotal movement between its two positions about a pivot axis which is parallel to said spin axis of said rotor.

12. A gyro as defined in claim 10 wherein said first bearing means comprise a frame turnable about said upright axis and wherein said second bearing means are pivotally mounted in said frame for movement between its two positions about a pivot axis which is parallel to said spin axis of said rotor.

13. A gyro as defined in claim 12 wherein said second bearing means comprise gas cushion means, and gas pressure means in communication therewith, said gas pressure means being mounted for movement with said second bearing means.

14. A gyro as defined in claim 13 wherein said gas pressure means and said gas cushion means form a closed fluid system through which gas under pressure is circulated.

15. A gyro as defined in claim 10 wherein said follow-up means include two coacting components one of which is carried by said first bearing means and the other of which is carried by second bearing means, said two components being arranged to engage each other only when said second bearing means is in said gyro compass position.

16. A gyro as defined in claim 10 wherein said second bearing means comprise gas cushion means, wherein said first bearing means comprise a frame which is turnable about said upright axis, and wherein said frame carries pressure pump means in communication with said gas cushion means.

17. A gyro as defined in claim 16 wherein said pressure pump means comprise a second gyro rotor having its spin axis oriented in a vertical axis mounted on said frame for movement therewith.

18. A gyro as defined in claim 17, further comprising gimbal means, said frame being part of said gimbal means and said second gyro rotor being carried by said part.

19. A gyro as defined in claim 18 wherein said second gyro rotor is provided with means which constitute said pressure pump means.

20. A gyro as defined in claim 9, further comprising a gimbal suspension having inner and outer gimbal rings, and a second gyro rotor having its spin axis oriented in the vertical axis carried by said inner gimbal ring.

References Cited

UNITED STATES PATENTS 3,254,419  6/1966  Hurlburt _____ 74—5 X

FOREIGN PATENTS 129,724  7/1919  Great Britain.

CORNELIUS J. HUSAR, *Primary Examiner.*